United States Patent
Moore et al.

(10) Patent No.: US 7,575,656 B2
(45) Date of Patent: Aug. 18, 2009

(54) WASTEWATER EVAPORATING TREATMENT AND DISPOSAL SYSTEM

(76) Inventors: Matthew Glen Moore, 29224 Old Office Rd., Rhoadesville, VA (US) 22542;
William Edgar Moore, 29224 Old Office Rd., Rhoadesville, VA (US) 22542

( * ) Notice: Subject to any disclaimer, the term of this patent is extended or adjusted under 35 U.S.C. 154(b) by 0 days.

(21) Appl. No.: 11/726,003

(22) Filed: Mar. 20, 2007

(65) Prior Publication Data

US 2008/0230456 A1   Sep. 25, 2008

(51) Int. Cl.
*B01D 1/16*   (2006.01)
*C02F 1/04*   (2006.01)

(52) U.S. Cl. .............. 159/4.01; 159/28.1; 159/47.3; 159/901; 210/167.32; 210/170.08; 210/195.1; 210/258; 210/295

(58) Field of Classification Search .............. 159/4.01, 159/28.1, 47.3, 901, DIG. 1, DIG. 40; 210/167.32, 210/170.08, 195.1, 258, 295
See application file for complete search history.

(56) References Cited

U.S. PATENT DOCUMENTS

| | | | | |
|---|---|---|---|---|
| 4,428,717 | A * | 1/1984 | Catterfeld | 416/186 R |
| 5,240,560 | A * | 8/1993 | Gregory | 159/16.1 |
| 5,582,680 | A * | 12/1996 | Vankouwenberg et al. | 159/23 |
| 5,772,843 | A * | 6/1998 | Rhodes | 159/16.1 |
| 6,047,724 | A * | 4/2000 | Nurse, Jr. | 137/363 |
| 6,637,379 | B2 * | 10/2003 | Hays et al. | 122/40 |
| 7,022,237 | B2 * | 4/2006 | Couch | 210/622 |
| 7,178,686 | B2 * | 2/2007 | Bolzer et al. | 220/567.1 |

* cited by examiner

*Primary Examiner*—Virginia Manoharan

(57) ABSTRACT

A system that treats wastewater by subjecting it to a heat source and destroying the microbes present therein and disposes of the wastewater to the atmosphere through evaporation. The components of the system are designed for in-ground or below-grade placement for aesthetic purposes and to eliminate a need for separate structures for housing or enclosing the system. The system does not generate a discharge as part of its regular operation and thus eliminates the need for disposal to an on-site feature or public sewer utility.

6 Claims, 2 Drawing Sheets

WASTEWATER EVAPORATING TREATMENT AND DISPOSAL SYSTEM

BACKGROUND OF THE INVENTION

1. Field of the Invention

The present invention relates to a system for the treatment and disposal of wastewater based on evaporation. The system is designed for in-ground placement exterior to a structure.

2. Description of the Related Art

In areas where public or central type sewer utility is not available for disposal, wastewater generated from structures must be treated and disposed of by on-site systems. However, a problem may be that a property does not have an area suitable for on-site earth subsurface or surface disposal due to laws, rules and regulations. In addition, an area within an existing structure may not be available to enclose or house components of a treatment system and construction of a separate structure for enclosing and housing components of a system may not be affordable or architecturally or aesthetically desired.

Due to the afore-mentioned problems, there is a need for an system that can convert wastewater to gas for atmospheric disposal only and can operate and be maintained while having in-ground placement.

U.S. Pat. No. 6,637,379 to Hays (et al.) discloses a liquid to gas converter for the purpose of wastewater treatment. However, the invention produces a non-atmospheric discharge and is not designed to operate and be maintainable while having in-ground placement.

The above invention, nor any other known invention or market available device or system, is seen to describe the instant invention as claimed.

BRIEF SUMMARY OF THE INVENTION

The instant invention is a system that evaporates the liquid portion of a wastewater feed and disposes of steam for disposal to the atmosphere only. Solids, and any other substance that can not be evaporated, can be re-circulated. The invention is also designed so that it can be placed in-ground or covered with soil.

A principal object of the invention is to make possible an on-site wastewater treatment system that does not require on-site, earth-surface or -subsurface disposal as part of its operation.

Another significant object of the invention is to operate and be maintainable without need for above-grade structures for housing, enclosing or accessing the device.

Another object of the invention is to protect ground water resources.

Another object of the invention is to be low-maintenance.

Another object of the invention is to be non-complex.

Another object of the invention is not to require use of expensive materials for construction.

DETAILED DESCRIPTION OF THE INVENTION

Figure 1:
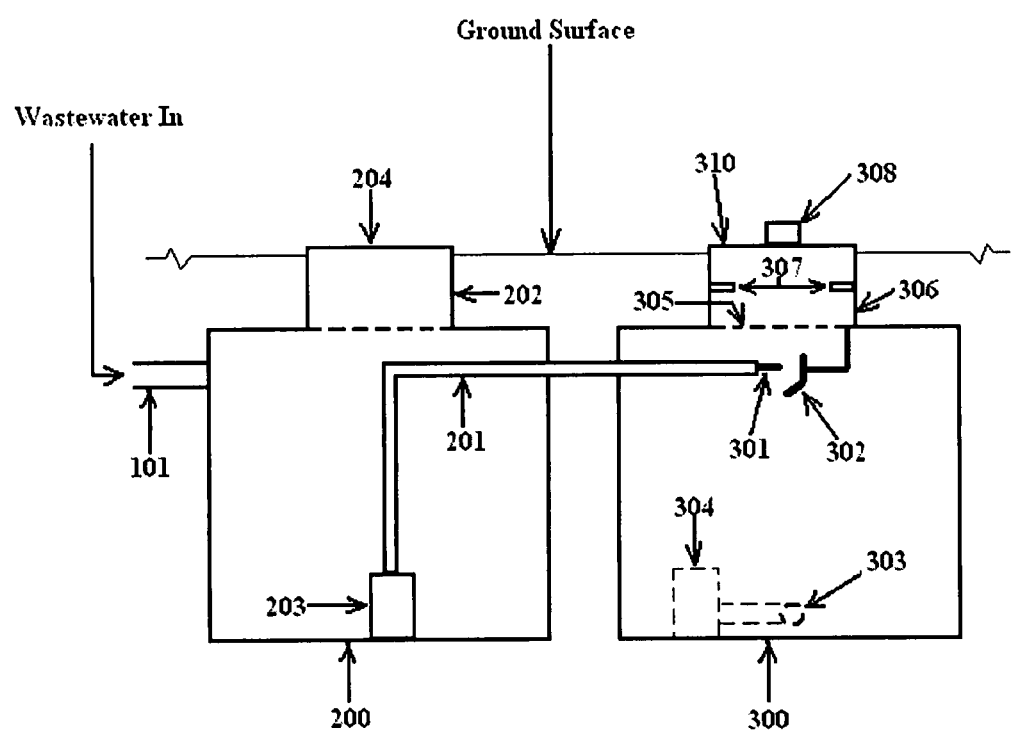
FIG. 1 is an enlarged, profile view relative to a vertical cut through the invention components to show internal parts.

Referring to FIG. 1, the present invention, having a holding tank 200 and an evaporation tank 300 shown having in-ground placement. Wastewater, consisting of suspended solids only, first enters the holding tank through an inlet pipe 101 where it is then moved through a force main conduit 201 that is connected to a pump 203 on the end within the holding tank 200 and fitted with a number of nozzles 301 within the evaporation tank 300. Due to the pumping force and flow restricting openings within the nozzles 301, wastewater is emitted in spray form when contacting a heated element 302 and an amount of the liquid portion of the wastewater is evaporated. The operating temperature of the heated element 302 is such that the wastewater is treated by destroying microbes. The heated element 302 consists of any material that absorbs or generates heat and can also be a device that emits flame. The portion of wastewater that is converted to steam rises through an opening 305 and into a riser 306 and then through a vent 308 to the atmosphere for disposal. Optionally, the riser 306 can be fitted with a number of heat nozzles 307 that emit a flame or dry heat for the purpose of increasing the temperature of vapor in order to reduce its visibility when passing through the vent 308.

Figure 2:
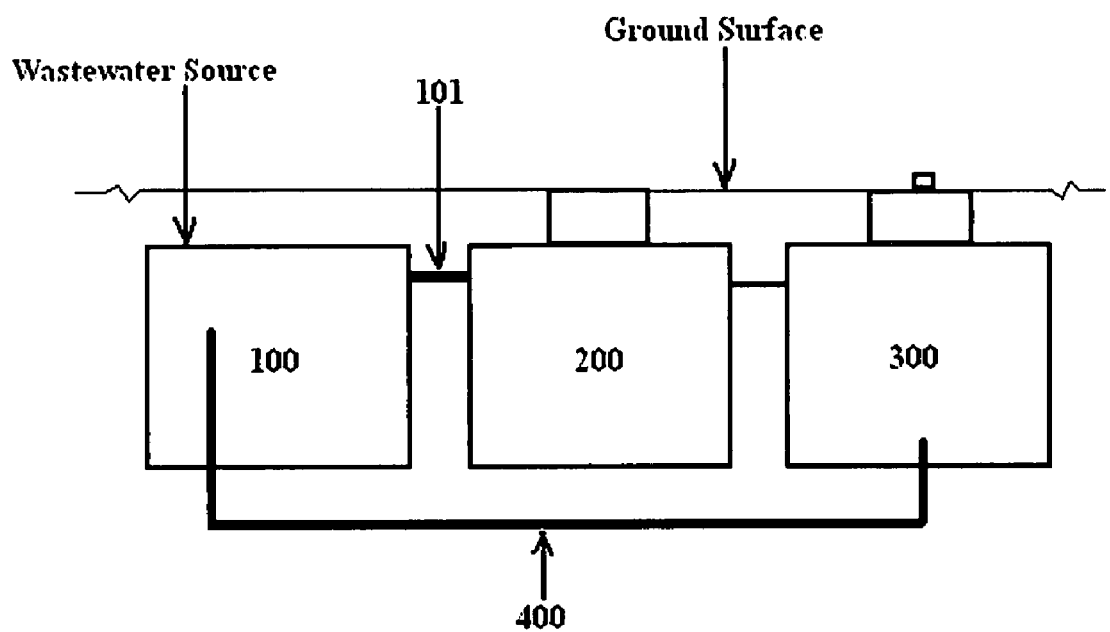
FIG. 2 is a profile view of the invention components relative to a wastewater source.

The solids, along with other substances, within the wastewater that do not evaporate collect at the bottom of the evaporation tank 300 and are moved by gravity or optional pump 304 through an opening 303 and, as shown in FIG. 2, return pipe 400 a wastewater source 100 which is connected by inlet pipe 101 to the holding tank 200. Therefore, portions of wastewater are re-circulated through the holding tank 200 and evaporation tank 300 continuously or until contact with the heated element 302 does cause conversion to steam or vapor.

The parts: pump 203, heated element 302 and optional heat nozzles 307, are wired together and switch controlled such that when the wastewater within the holding tank 200 reaches a certain level the heated element 302 and heat nozzles 307 are activated first. After the heated element 302 reaches operating temperature, the pump 203 moves water through the force main 201 until the wastewater reaches a certain lower level that inactivates the parts. The optional pump 309 is wired to a separate circuit so that it is turned on and off based on the level of wastewater within the evaporation tank 300. A switch (not shown) can be included for the purpose of turning on an alarm and shutting off the pump 203 if the wastewater level in the holding tank 200 exceeds a maximum depth.

Riser 306 serves as an access point to the interior of the evaporation tank 300 by having a removable lid section 310 and riser 202 serves as an access point to the holding tank 200 by having a removable lid section 204. Furthermore, riser 306 and riser 202 have height dimension extending to at- or above-grade when holding tank 200 and evaporation tank 300 are placed below-grade or in-ground.

Referring to FIG. 2, the instant invention operates with a wastewater source 100 in order to form a complete on-site wastewater treatment system that has only atmospheric disposal. Wastewater source 100 represents any type apparatus that filters the wastewater, or causes it to undergo liquid separation, such that suspended solids are conveyed to the holding tank 200. The instant invention can receive and dispose of wastewater from various treatment devices such as a septic tank, aerobic treatment unit and media filter. Furthermore, a screen type filter can be placed in-line of the connecting pipe to prevent solids having size larger than the openings with the flow restricting nozzles 301 from entering into the holding tank 200.

The preferred materials for constructing the holding tank 200 and evaporation tank 300 are concrete and durable plastic having tensile and compressive strength to withstand pressure from surrounding soil without collapsing or breaking.

The re-circulation ability of the instant invention promotes low energy use since it is not used for vaporizing solids; the temperature of the heated element 302 only has to be that which will evaporate and kill microbes, and less cleaning-type maintenance efforts since the solids are passed through the evaporation tank 300 instead of being accumulated in wet form or as dry ash. Furthermore, the re-circulation ability makes precise control of the volume or unit rate at which wastewater is emitted through the nozzles 301 unnecessary since the whole amount wastewater does not have to be evaporated in a single pass.

The invention is not complex; the holding tank 200 and evaporation tank 300 do not have moving parts other than those that are internal to the casing of the pump 203 and optional pump 304 which do not have to be maintained as part of operation. The pumps are replaced when needed. Also, the evaporation takes place in an atmospheric pressure environment and pressure gauges are not needed.

We claim:

1. A wastewater treatment and disposal system comprising: a wastewater source; a first tank having an inlet pipe through which wastewater is received from said wastewater source and a first access opening, a riser with a removable lid section and hollow interior centered to said first access opening, and first pump located interior to and for removing wastewater from said first tank; a second tank having a heating element located interiorly, a second access opening, a vented riser with removable lid section and hollow interior centered to said second access opening, a lower opening, and second pump located interior to and for removing wastewater from said second tank; a return conduit with an end connected to said lower opening in said second tank and an end connected to said wastewater source and a conduit with an end interior to said first tank and an opposite end interior to said second tank; wherein wastewater is forced by the first pump through said conduit and into contact with heat from said heating element in order to convert the wastewater to steam that is disposed of to the atmosphere through said vented riser and portions of wastewater that do not evaporate are forced by the second pump through said lower opening and said return conduit to said wastewater source;

said riser and said vented riser have height dimensions to at- or above-grade such that said first tank and said second tank can be accessed when placed below-grade or in-ground.

2. The wastewater treatment and disposal system as defined in claim 1 wherein said wastewater source is any device or system that filters, treats or separates the wastewater such that liquid with suspended solids is moved through said inlet pipe to said first tank.

3. The wastewater treatment and disposal system as defined in claim 1 wherein said vented riser includes interior nozzles that emit high temperature air or open flame to reduce visibility of vapors escaping to the atmosphere.

4. The wastewater treatment and disposal system as defined in claim 1 wherein said heating element is of material that absorbs or generates heat due to electrical current.

5. The wastewater treatment and disposal system as defined in claim 1 wherein said heating element is a device that absorbs or generates heat due to chemical reaction.

6. The wastewater treatment and disposal system as defined in claim 1 wherein said heating element is a device that emits fire.

\* \* \* \* \*